US012047251B1

(12) United States Patent
Dudley et al.

(10) Patent No.: US 12,047,251 B1
(45) Date of Patent: Jul. 23, 2024

(54) NETWORK POWER OPTIMIZATION CONTROLLER

(71) Applicant: Charter Communications Operating, LLC, St. Louis, MO (US)

(72) Inventors: Thomas Watson Dudley, Castle Rock, CO (US); Thomas Lawrence Bowlby, Golden, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/358,355

(22) Filed: Jul. 25, 2023

(51) Int. Cl.
*G06F 15/16* (2006.01)
*H04L 41/0896* (2022.01)
*H04L 41/147* (2022.01)

(52) U.S. Cl.
CPC ........ *H04L 41/147* (2013.01); *H04L 41/0896* (2013.01)

(58) Field of Classification Search
CPC .......................... H04L 41/147; H04L 41/0896
USPC ........................................................ 709/223
See application file for complete search history.

(56) References Cited

U.S. PATENT DOCUMENTS

| | | | | |
|---|---|---|---|---|
| 8,681,969 B1 * | 3/2014 | Rodde | ..................... | H04N 7/147 348/14.02 |
| 8,693,500 B2 * | 4/2014 | Ludwig | ............... | H04L 65/1066 370/468 |
| 8,737,252 B2 * | 5/2014 | Davis | ..................... | H04L 5/0023 370/252 |
| 9,071,619 B2 * | 6/2015 | Ludwig | ............... | H04L 41/0896 |
| 9,203,889 B2 * | 12/2015 | Rodde | ..................... | H04N 7/147 |
| 9,642,146 B2 * | 5/2017 | Zhang | .................... | H04W 24/02 |
| 10,390,348 B2 * | 8/2019 | Zhang | ..................... | H04L 41/12 |
| 10,554,560 B2 * | 2/2020 | Vasseur | .................... | H04L 45/22 |
| 10,673,740 B2 * | 6/2020 | Rafique | ................. | H04L 45/125 |
| 10,749,807 B2 * | 8/2020 | Filley | ................... | G08G 1/0133 |
| 11,265,252 B2 * | 3/2022 | Filley | .................... | H04W 4/021 |

(Continued)

OTHER PUBLICATIONS

Charalampou, Paris, and Efstathios D Sykas, "An SDN Focused Approach for Energy Aware Traffic Engineering in Data Centers.", Sensors, vol. 19, Sep. 14, 2019, pp. 1-15, doi:10.3390/s19183980.

*Primary Examiner* — Moustafa M Meky
(74) *Attorney, Agent, or Firm* — Young Basile Hanlon & MacFarlane, P.C.

(57) ABSTRACT

Methods and systems for automatically optimizing power utilization in a network. A method for automatically optimizing power utilization in a network includes obtaining, by a network controller from a database, systems provisioned in the network, wherein a system includes one or more actionable components and wherein the systems and associated one or more actionable components are actional elements, obtaining predictive traffic model statistics for a circuit under evaluation, wherein the circuit transits between at least two systems of the systems in the network, obtaining real-time traffic statistics for the circuit under evaluation; and disabling, by the network controller when the real-time traffic model statistics are within a threshold of the predictive traffic model statistics, one or more actional elements to optimize power utilization while factoring in fate sharing dependencies associated with the one or more actional elements and while maintaining minimum utilization requirements of the network.

20 Claims, 7 Drawing Sheets

(56) References Cited

U.S. PATENT DOCUMENTS

| | | | |
|---|---|---|---|
| 11,689,944 B2* | 6/2023 | Vasudevan | H04L 41/145 |
| | | | 370/252 |
| 2013/0258868 A1* | 10/2013 | Davis | H04L 5/0044 |
| | | | 370/252 |
| 2014/0211811 A1* | 7/2014 | Ludwig | H04L 65/1046 |
| | | | 370/468 |
| 2017/0237625 A1* | 8/2017 | Zhang | H04W 28/0958 |
| | | | 370/254 |
| 2018/0063002 A1* | 3/2018 | Filley | H04L 47/127 |
| 2019/0068482 A1* | 2/2019 | Rafique | H04L 41/064 |
| 2020/0351205 A1* | 11/2020 | Filley | G08G 1/04 |
| 2024/0031235 A1* | 1/2024 | Zhu | H04L 41/0866 |

\* cited by examiner

NETWORK POWER OPTIMIZATION CONTROLLER

TECHNICAL FIELD

This disclosure relates to networks and network components. More specifically, devices and methods for network power minimization by enabling and/or disabling the network components based on utilization and fate dependencies.

BACKGROUND

Networks are comprised of systems, which in turn include network components. Networks and the network components therein are purposely overbuilt or overprovisioned for various reasons. In one instance, networks and the network components therein are built to provide sufficient capacity during a worst-case scenario of a single failure event during peak network utilization periods. For example, if a network router fails during peak traffic utilization, the neighboring devices must be able to handle the increased capacity demand. This can lead to overprovisioning of components that are unused during network steady state. In another or complementary instance, networks have various traffic patterns and peak utilization periods. Peak internet utilization is typically between 7 μm-9 μm per region. This can lead to overprovisioning of components required for average utilization to be able to sustain the peak rates for a brief period. Overprovisioning results in increased power consumption.

SUMMARY

Disclosed herein are systems and methods for network power minimization by configuring network components based on utilization and fate dependencies. In implementations, a method for automatically optimizing power utilization in a network includes obtaining, by a network controller from a database, systems provisioned in the network, wherein a system includes one or more actionable components and wherein the systems and associated one or more actionable components are actional elements, obtaining, by the network controller from the database, predictive traffic model statistics for a circuit under evaluation, wherein the circuit transits between at least two systems of the systems in the network, obtaining, by the network controller from the database, real-time traffic statistics for the circuit under evaluation; and disabling, by the network controller when the real-time traffic model statistics are within a threshold of the predictive traffic model statistics, one or more actional elements to optimize power utilization while factoring in or based on at least fate sharing dependencies associated with the one or more actional elements and while maintaining minimum utilization requirements of the network.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
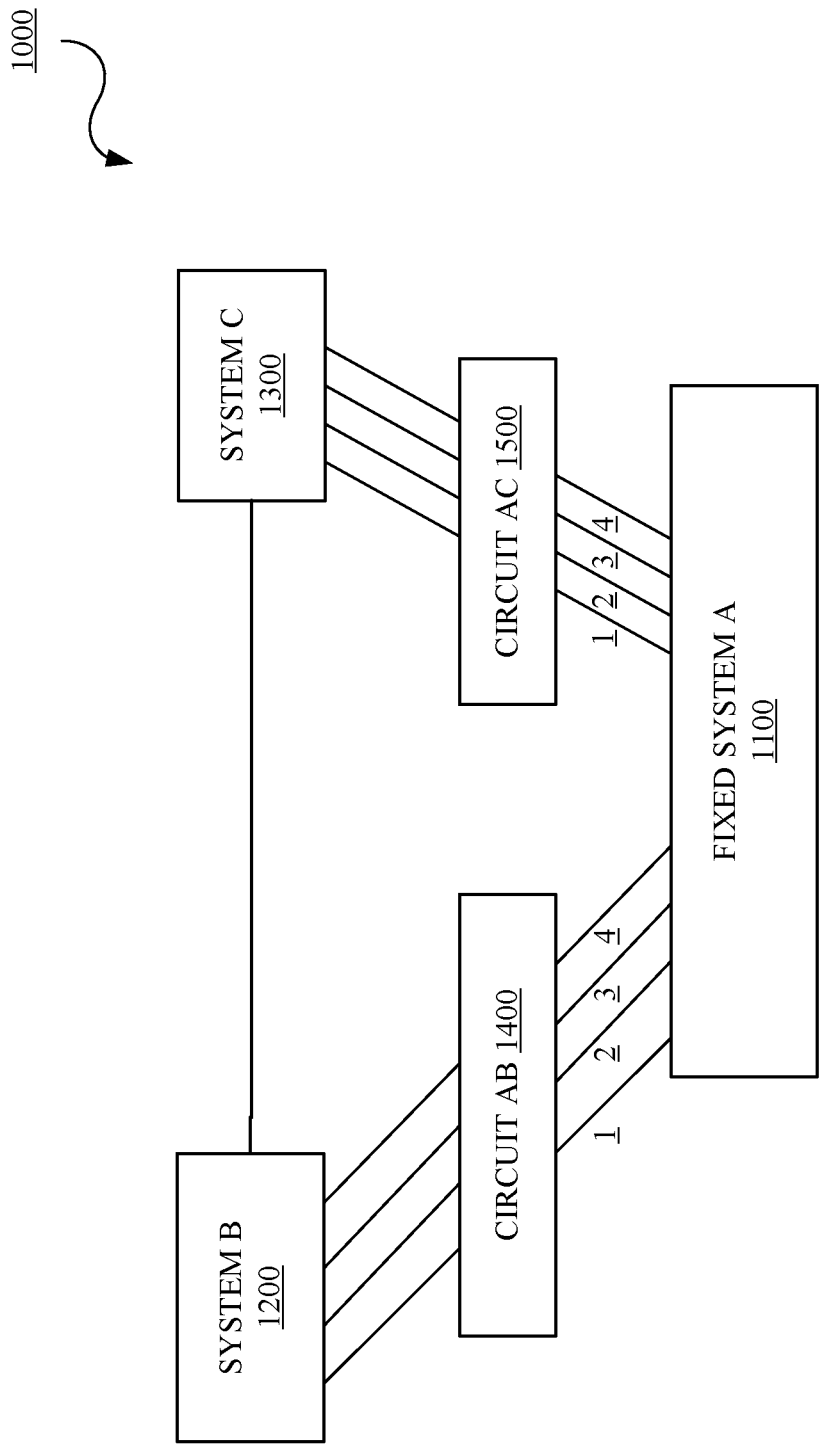
FIG. 1 is a diagram of an example of a network.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a diagram of an example of a network 1000. The network 1000 includes a fixed system A 1100, a system B 1200, and a system C 1300. A circuit AB 1400 connects the fixed system A 1100 with the system B 1200 via links AB 1, AB 2, AB 3, and AB 4. A circuit AC 1500 connects the fixed system A 1100 with the system C 1300 via links AC 1, AC 2, AC 3, and AC 4. In this instance, the fixed system A 1100 is a system which has a defined and set physical configuration that is not adaptable or adjustable. In this instance, the circuit AB 1400 and the circuit AC 1500 have no fate dependencies. That is, each circuit is only connected to two systems. Accordingly, power optimization is simply based on utilization, which is straightforward. For example, one or more of the links AB 1, AB 2, AB 3, and AB 4 and/or the links AC 1, AC 2, AC 3, and AC 4 can be disabled without consideration of other systems, respectively.

Described herein are systems, devices, and methods to automatically enable or disable network components based on current utilization performance characteristics and fate dependencies to minimize power consumption. A network power optimization controller can enable or disable one or more links, individual components of modular or chassis-based systems, the entirety of a modular or chassis-based system, the entirety of a fixed system, and/or combinations thereof using real-time traffic utilization statistics, predictive traffic models, network fate dependencies, and minimum utilization requirements.

Figure 2:
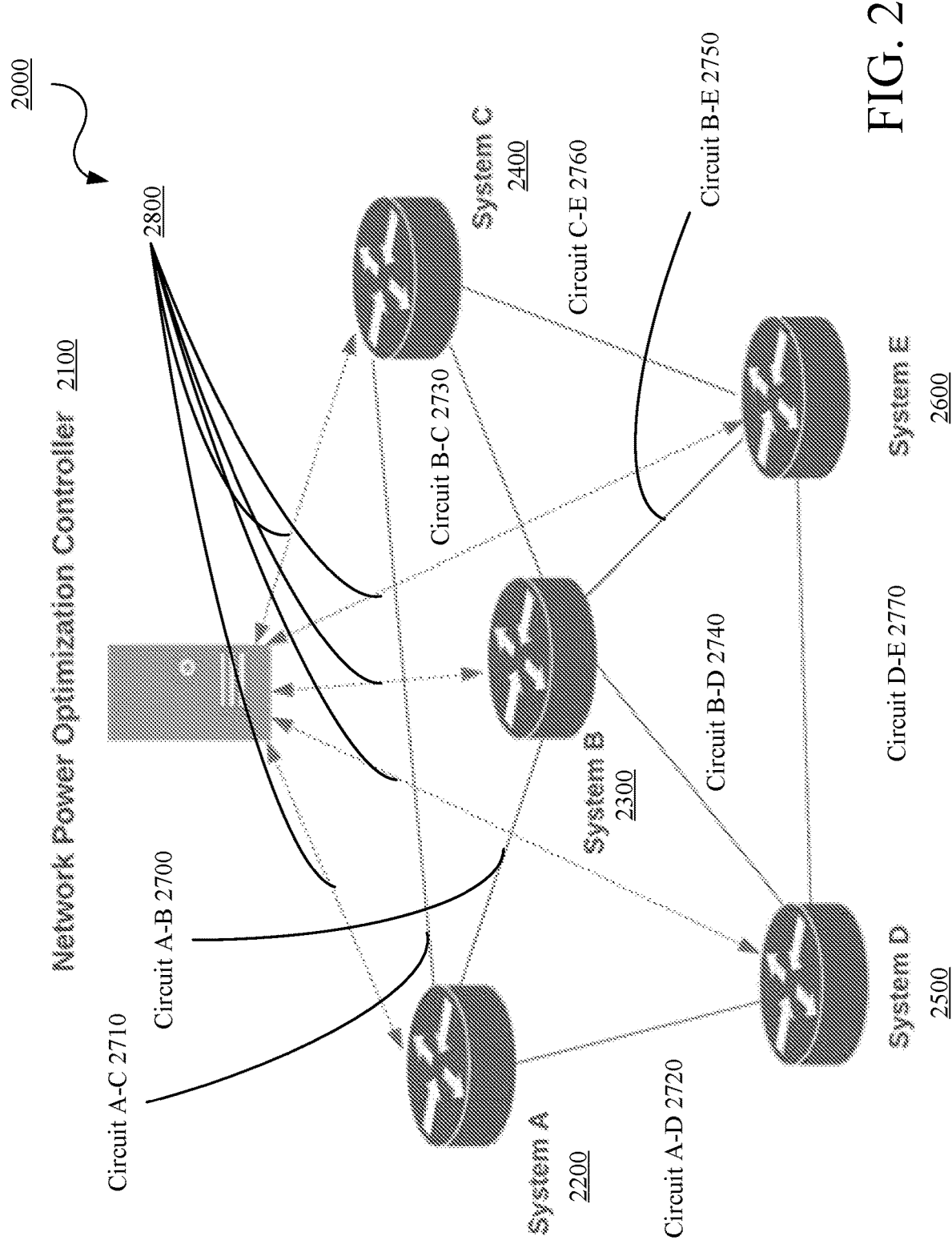
FIG. 2 is a diagram of an example of a network in accordance with embodiments of this disclosure.

FIG. 2 is a diagram of an example of a network 2000 in accordance with embodiments of this disclosure. The network 2000 can include, but is not limited to, a network power optimization controller 2100, a system A 2200, a system B 2300, a system C 2400, a system D 2500, a system E 2600, a circuit A-B 2700, a circuit A-C 2710, a circuit A-D 2720, a circuit B-C 2730, a circuit B-D 2740, a circuit B-E 2750, a circuit C-E 2760, a circuit D-E 2770, and system and/or control links 2800. The number of systems, components, and/or circuits shown herein are illustrative and there may be more or less in the network 2000. The network 2000 and the elements therein may include other elements which may be desirable or necessary to implement the devices, systems, and methods described herein. However, because such elements do not facilitate a better understanding of the disclosed embodiments, a discussion of such elements and steps may not be provided herein.

Figure 3:
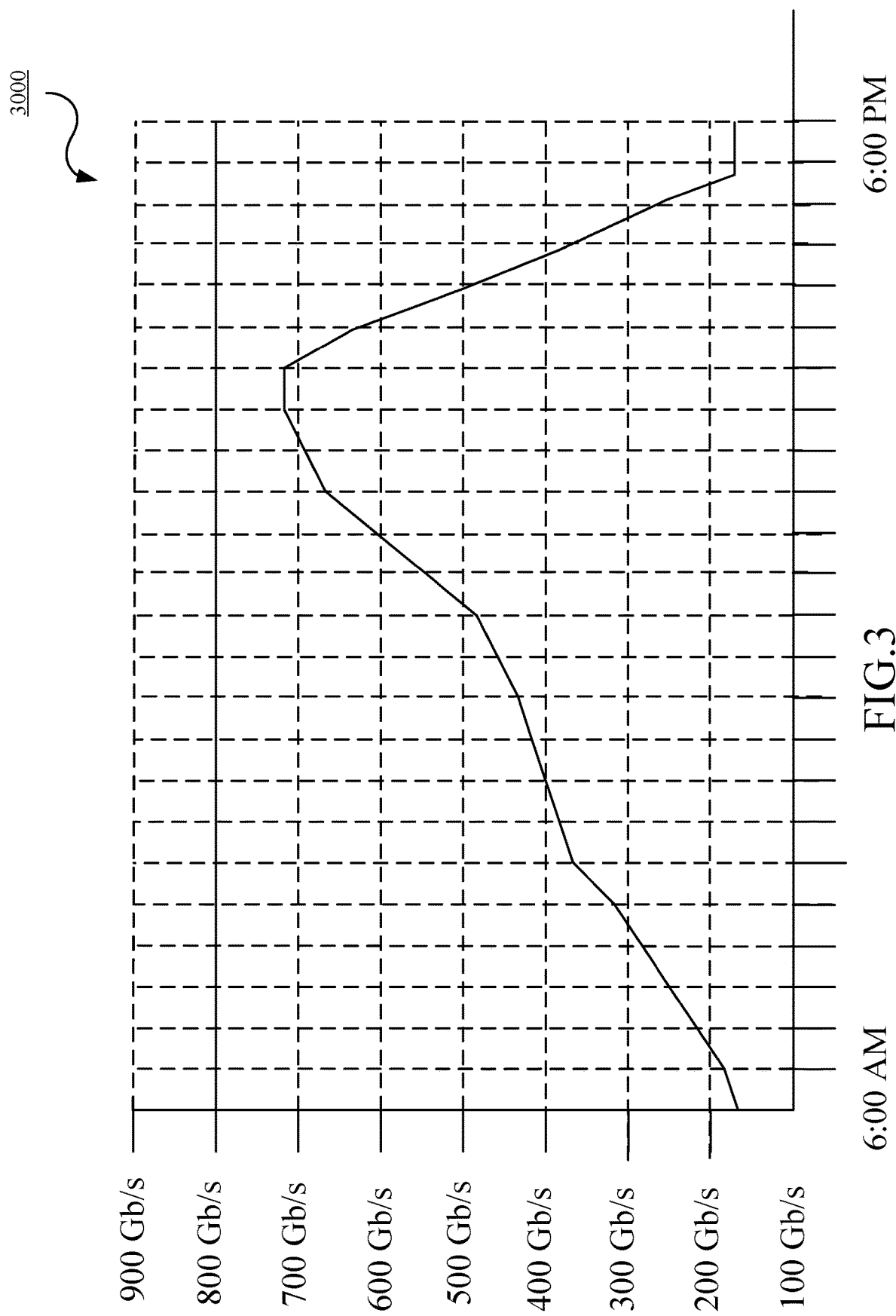
FIG. 3 is a graph of an example of a network utilization in accordance with embodiments of this disclosure.
Figure 4:
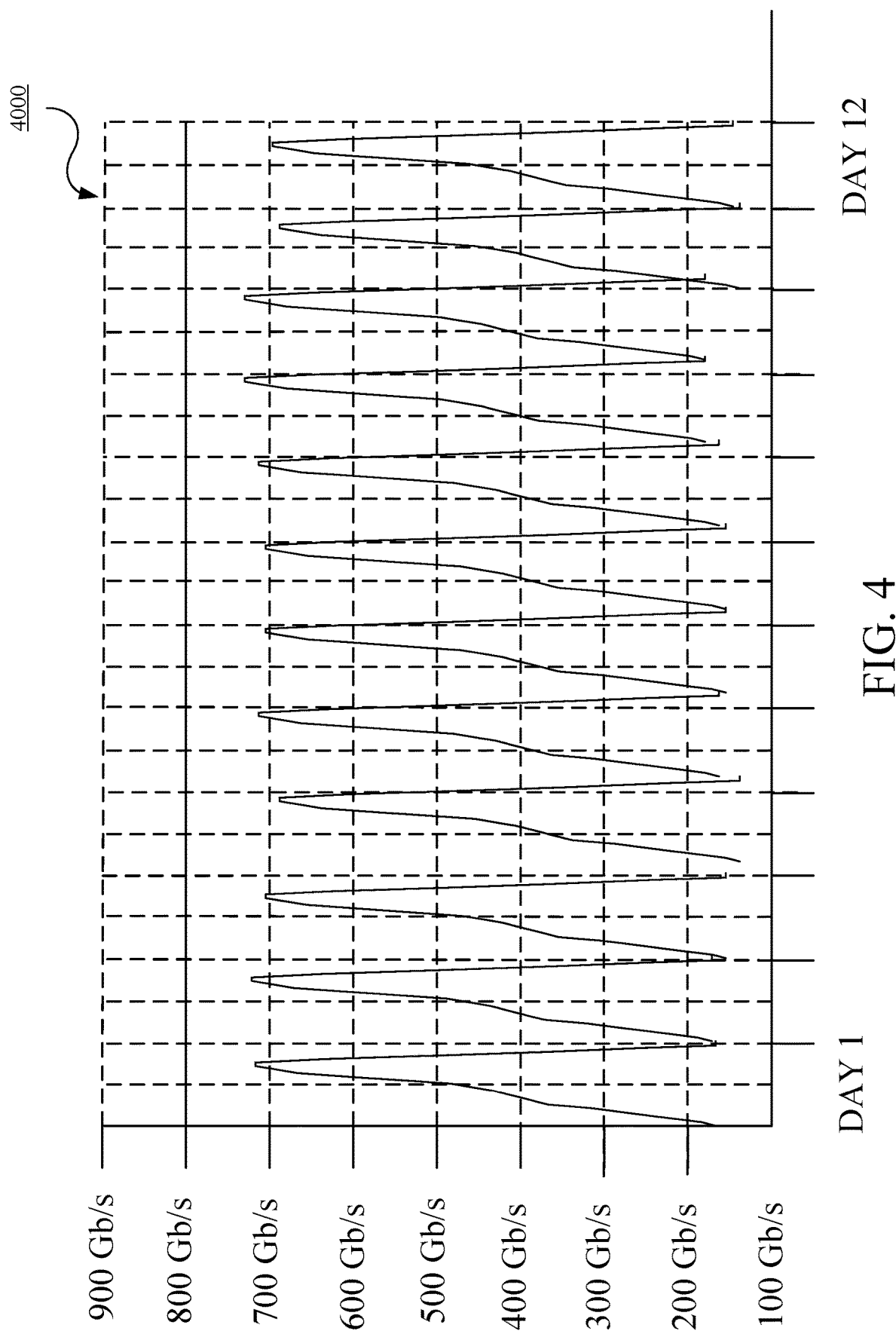
FIG. 4 is a graph of an example of network utilization patterns in accordance with embodiments of this disclosure.

FIG. 3 is a graph 3000 of an example of a network utilization in the network 2000 in accordance with embodiments of this disclosure. FIG. 4 is a graph 4000 of an example of network utilization patterns in the network 2000 in accordance with embodiments of this disclosure. Traffic or data transits network, such as the network 2000. The utilization for a 24 hour period can be graphed as shown in FIG. 3. The example graph 3000 shows a 24 hour traffic pattern of a single circuit in the network 2000 with a peak utilization of about 700 Gbps, an average of about 400 Gbps, and a minimum of about 150 Gbps. As such, the circuit is overprovisioned for 1400 Gbps to sustain increased demands during a network impairment. This one circuit, for example, can be a bundle of 14 individual member links. The information shown in FIG. 3 can be tracked over a period of time such as a month or several weeks. The example graph 4000 shows data for the same circuit of FIG. 3 over several weeks. The graph 4000 shows that the traffic pattern can follow a predictable trend that can be used by the network power optimization controller 2100 to enable and disable components outside of peak utilization periods or network failure events while ensuring sufficient capacity is sustained to handle a network impairment.

Each of the systems, e.g., the system A 2200, the system B 2300, the system C 2400, the system D 2500, and the system E 2600, can be a fixed system and/or a modular system. In implementations, the modular system can include multiple fixed systems as components therein, multiple line cards, multiple elements, and/or combinations thereof which share power, cooling, and other functionality, and where one or more of the components in the modular system can be disabled or enabled separately from the other components. In implementations, each of the systems can include other components such as one or more links, interfaces, and/or combinations thereof which can be disabled or enabled separately from the other components. In implementations, a system is a network element responsible for delivering services across the network 2000. The network elements can be, for example, routers, switches, servers, optical line systems, etc.

Each of the circuits, e.g., the circuit A-B 2700, the circuit A-C 2710, the circuit A-D 2720, the circuit B-C 2730, the circuit B-D 2740, the circuit B-E 2750, the circuit C-E 2760, and the circuit D-E 2770, can indicate the systems and the components therein that are included in such circuit, where the circuit can interconnect and forward data between the systems in the network 2000. The circuits can provide fate sharing dependency information for each of the systems and the components therein when the network power optimization controller 2100 is determining which of the systems and the components therein are to be enabled or disabled. The inclusion of the fate sharing information enables automatic enable and/or disable of components as is needed to maintain minimum operational configuration, such as for network redundancy and minimum capacity, of the network 2000.

The network power optimization controller 2100 can be located at a service provider back-office, central office, and the like and is connected and/or in communication with (collectively "connected to"), directly or indirectly to each of the systems (e.g., the system A 2200, the system B 2300, the system C 2400, the system D 2500, and the system E 2600) via the links 2800. The network power optimization controller 2100 can, in real-time or periodically, query all systems identified in an inventory database (e.g., the system A 2200, the system B 2300, the system C 2400, the system D 2500, and the system E 2600) to obtain utilization statistics for the respective systems and the circuits identified in the inventory database (e.g., the circuit A-B 2700, the circuit A-C 2710, the circuit A-D 2720, the circuit B-C 2730, the circuit B-D 2740, the circuit B-E 2750, the circuit C-E 2760, and the circuit D-E 2770). The network power optimization controller 2100 can query a database or obtain current states of the existing components in the systems, where a component can be one or more interface(s), one or more line card(s), or an entire system.

Operationally, the network power optimization controller 2100 can compare the current utilization statistics for all of the circuits to a predictive utilization trend model. This can be used to determine or base a decision process on how many components should be enabled or disabled while factoring in or at least based on fate sharing dependencies to optimize power consumption while ensuring sufficient capacity is sustained to handle a network impairment. That is, the network power optimization controller 2100 can automatically enable or disable network components based on trends of utilization patterns and/or current utilization performance characteristics and fate sharing dependencies to minimize power consumption during non-peak periods.

Figure 5:
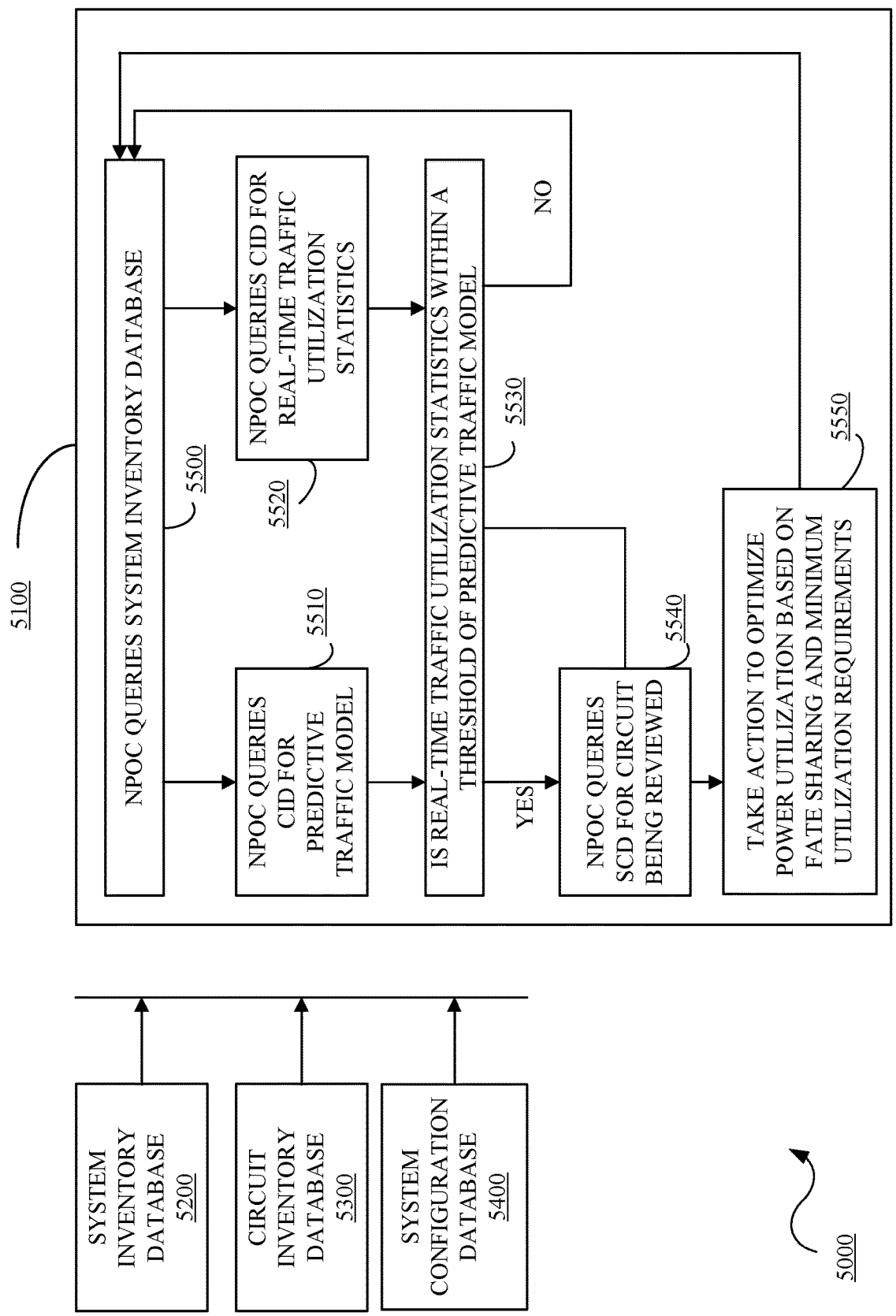
FIG. 5 is a diagram of an example of a system and method in accordance with embodiments of this disclosure.

FIG. 5 is a diagram of an example of a system 5000 and method in accordance with embodiments of this disclosure. The system 5000 can include, but is not limited to, a network power optimization controller 5100, a system inventory database 5200, a circuit inventory database 5300, and a system configuration database 5400. The elements shown herein are illustrative and there may be more or less in the system 5000. The system 5000 and the elements therein may include other elements which may be desirable or necessary to implement the devices, systems, and methods described herein. However, because such elements do not facilitate a better understanding of the disclosed embodiments, a discussion of such elements and steps may not be provided herein.

The network power optimization controller 5100 can be the network power optimization controller 2100 of FIG. 2.

The system inventory database 5200 can include an up-to-date and accurate list of every system within a network. The system inventory database can include each platform including chassis type, line cards, interfaces, standards-based naming schemas, management IP addresses, and/or information. Every system and each chassis, line card, interface, and/or each actionable component in terms of enabling and/or disabling (collectively "actionable component") of each system in the database can be assigned a unique component identification number.

The circuit inventory database 5300 can contain specifications for all circuits in the network. As circuits are provisioned, each circuit can be assigned a fate sharing number that is a concatenated list of all component identification numbers of the actionable components the circuit can transit. The circuit inventory database 5300 can be queried for advanced analytics for end-to-end circuit mapping, fate sharing characteristics, utilization statistics, capacity planning, and for visualization of traffic trends.

The system configuration database 5400 can include a modeled abstraction of the standard configurations of all systems in the network. The configurations in the system configuration database 5400 are the steady state configuration of a system prior to any influence from the network power optimization controller 5100.

Operationally, the network power optimization controller 5100 can implement and/or execute an automated method to enable or disable a system and/or actionable components (also can be referred to herein collectively as "actional elements") based on current utilization performance characteristics and fate dependencies to minimize power consumption. The system inventory database 5200 can be queried with respect to one or more systems in a network. The circuit inventory database 5300 can be queried for a predictive traffic model and/or predictive traffic model statistics (5510). The predictive traffic model can be based on or associated with traffic trends on the network with respect to a circuit under evaluation. The circuit inventory database 5300 can be queried for real-time traffic utilization statistics with respect to the circuit under evaluation (5520). A comparison can be performed to determine whether the real-time traffic utilization statistics are within a defined threshold of the predictive traffic model statistics (5530). The method starts over or recycles when the real-time traffic utilization statistics are not within the defined threshold of the predictive traffic model statistics (NO path). A same or a different circuit can be evaluated.

The system configuration database 5400 can be queried when the real-time traffic utilization statistics is within the defined threshold of the predictive traffic model statistics (YES path). The system configuration database 5400 can be queried to obtain a current state of the system and/or actionable components related to the circuit under evaluation (5540). System and/or actionable components related to the circuit under evaluation can be enabled or disabled to optimize power utilization while factoring in fate sharing dependencies associated with the system and/or actionable components related to the circuit under evaluation and while maintaining minimum utilization requirements (5550).

In implementations, the predictive traffic model statistics can indicate a downturn in traffic and certain system and/or components can be disabled. In implementations, the predictive traffic model statistics can indicate an upturn in traffic and certain system and/or components can be enabled. The minimum utilization requirements can account for network redundancy, network capacity, and/or similar network related performance factors. The method starts over or recycles with a same or different circuit in the network. In implementations, circuits can be evaluated on a round robin basis. In implementations, circuits can be evaluated based on an event or alert associated with traffic on the network and/or circuit, failure of a network, system, component, and/or combinations thereof, a change in capacity, quality of service, and/or combinations thereof. In implementations, the method is performed in real-time. In implementations, the method is performed in real-time and on a continuous basis.

Figure 6:
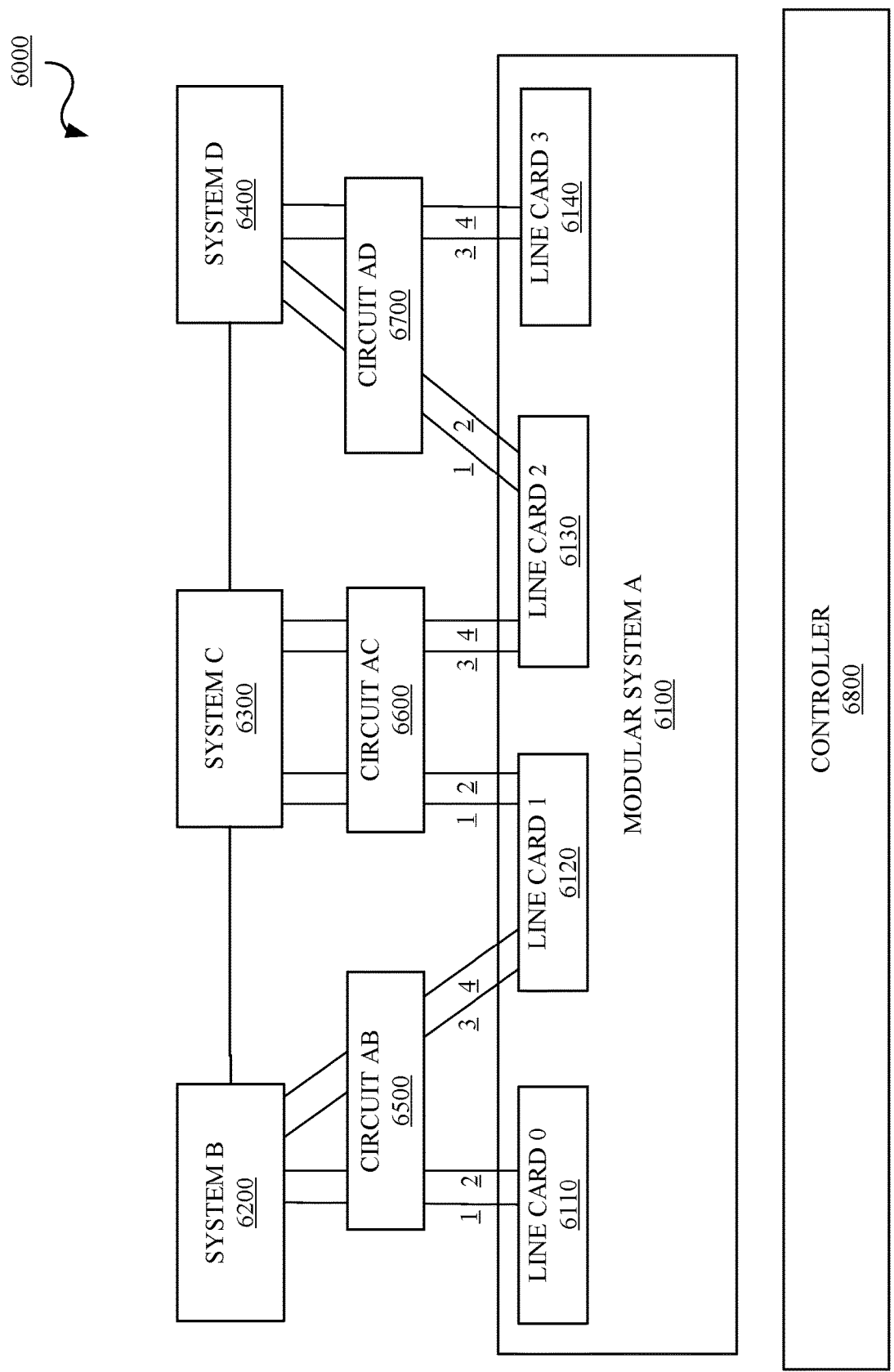
FIG. 6 is a diagram of an example of a network in accordance with embodiments of this disclosure.

FIG. 6 is a diagram of an example of a network 6000 in accordance with embodiments of this disclosure. The network 6000 can include, but is not limited to, a modular system A 6100, a system B 6200, a system C 6300, a system D 6400, a circuit AB 6500, a circuit AC 6600, a circuit AD 6700, and a network power optimization controller 6800. The modular system A 6100 can include, but is not limited to, a line card 0 6110, a line card 1 6120, a line card 2 6130, and a line card 3 6140. The number of systems, components, and/or circuits shown herein are illustrative and there may be more or less in the network 6000. The network 6000 and the elements therein may include other elements which may be desirable or necessary to implement the devices, systems, and methods described herein. However, because such elements do not facilitate a better understanding of the disclosed embodiments, a discussion of such elements and steps may not be provided herein.

The modular system A 6100, the system B 6200, the system C 6300, and the system D 6400 can be the systems as described in FIG. 2, for example.

The circuit AB 6500, the circuit AC 6600, and the circuit AD 6700 can be circuits as described in FIG. 2, for example.

The network power optimization controller 6800 can be the network power optimization controller of FIG. 2 and FIG. 5. The network power optimization controller 6800 can obtain information from a system inventory database, a circuit inventory database, and a system configuration database as described in FIG. 5.

Operationally, the network power optimization controller 6800 can operate a method as described with respect to FIG. 5. In the illustrative examples, it is initially assumed that the real-time traffic utilization is within the predictive traffic utilization.

In the illustrative example, if the circuit AD 6700 has a traffic utilization greater than 70%, then no actions are taken.

In the illustrative example, if the circuit AD 6700 has a traffic utilization greater than 45% but less than 70%, then link 4 of the circuit AD 6700 is disabled. In this instance, the links 1-3 can provide redundancy and maintain minimum capacity as needed based on fate dependencies.

In the illustrative example, if the circuit AD 6700 has a traffic utilization greater than 20% but less than 45%, then links 3 and 4 and line card 3 6140 of the circuit AD 6700 are disabled. In this instance, the links 1 and 2 can provide redundancy and maintain minimum capacity as needed based on fate dependencies.

In the illustrative example, if the circuit AD 6700 has a traffic utilization greater than 0% but less than 20%, then links 2, 3, and 4 and line card 3 6140 of the circuit AD 6700 are disabled. In this instance, the link 1 and the line card 2 6130 can provide redundancy and maintain minimum capacity as needed based on fate dependencies.

In the illustrative example, if the circuit AD 6700 has a traffic utilization less than 10% and the circuit AC 6600 has a traffic utilization less than 85%, then links 1, 2, 3, and 4 and line card 3 6140 of the circuit AD 6700 are disabled. In this instance, the circuit AC 6600 can provide redundancy and maintain minimum capacity as needed based on fate dependencies.

In the illustrative example, if the circuit AD 6700 is disabled and the circuit AC 6600 has a traffic utilization less than 50% and the circuit AB 6500 has a traffic utilization less than 50%, then system D can be disabled. In this instance, the system B 6200, the system C 6300, the circuit AB 6500, and the circuit AC 6600 can provide redundancy and maintain minimum capacity as needed based on fate dependencies.

Figure 7:
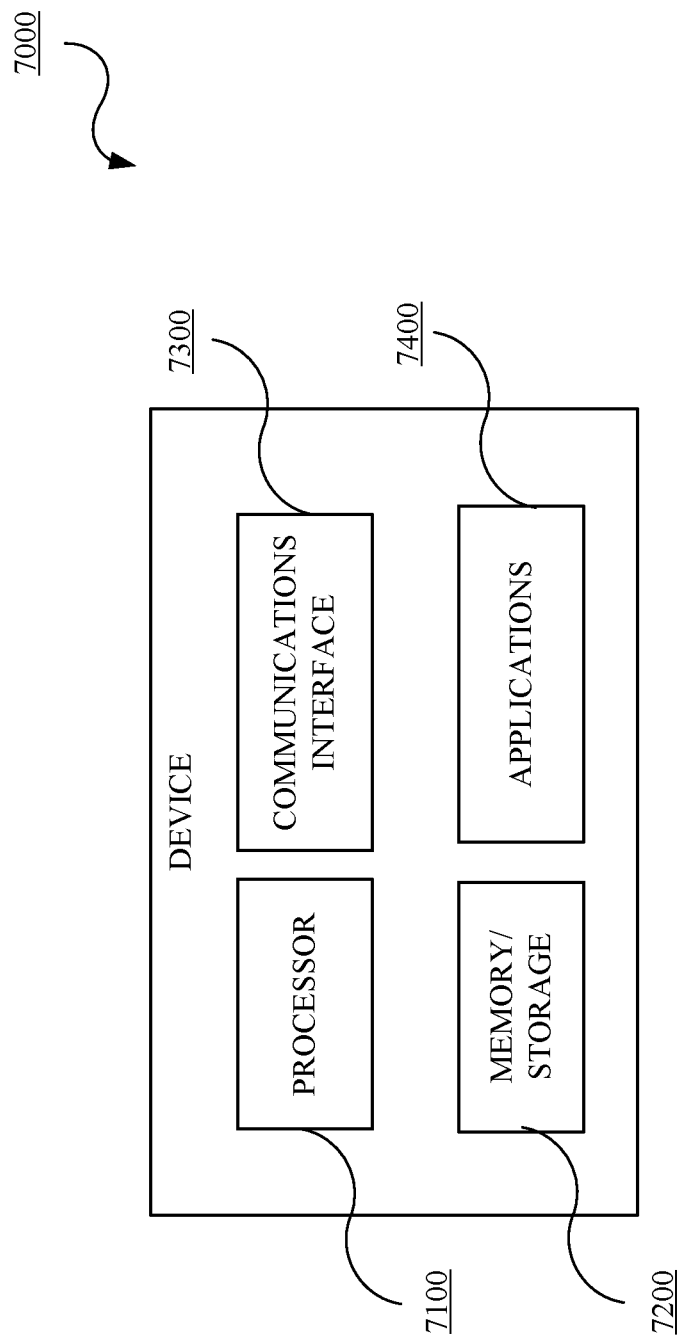
FIG. 7 is a block diagram of an example of a device in accordance with embodiments of this disclosure.

FIG. 7 is a block diagram of an example of a device 7000 in accordance with embodiments of this disclosure. The device 7000 may include, but is not limited to, a processor 7100, a memory/storage 7200, a communication interface 7300, and applications 7400. The device 7000 may include or implement, for example, the systems, the components, the databases, and the network power optimization controller as described with respect to FIGS. 2, 5, and 6. The applicable or appropriate flows, techniques, or methods described herein, for example in FIG. 5, may be stored in the memory/storage 7200 and executed by the processor 7100 in cooperation with the memory/storage 7200, the communications interface 7300, and the applications 7400, as appropriate. The device 7000 may include other elements which may be desirable or necessary to implement the devices, systems, and methods described herein. However, because such elements and steps do not facilitate a better understanding of the disclosed embodiments, a discussion of such elements and steps may not be provided herein.

Disclosed herein are methods for automatically optimizing power utilization in a network. In implementations, a method or computer-implemented method includes obtaining, by a network controller from a database, systems provisioned in the network, where a system includes one or more actionable components and wherein the systems and associated one or more actionable components are actional elements, obtaining, by the network controller from the database, predictive traffic model statistics for a circuit under evaluation, where the circuit transits between at least two systems of the systems in the network, obtaining, by the network controller from the database, real-time traffic statistics for the circuit under evaluation, and disabling, by the network controller when the real-time traffic model statistics are within a threshold of the predictive traffic model statistics, one or more actional elements to optimize power utilization while factoring in or at least based on fate sharing dependencies associated with the one or more actional elements and while maintaining minimum utilization requirements of the network.

In implementations, each actionable component has a unique component identification number, the circuit has a fate sharing number which is a concatenation of unique component identification numbers associated with the at least two systems, and the fate sharing number is representative of the fate sharing dependencies associated with the one or more actional elements. In implementations, the circuit has a fate sharing number associated with the at least two systems and respective associated one or more actionable components and the fate sharing number is representative of the fate sharing dependencies associated with the one or more actional elements. In implementations, the one or more actional elements are related to the circuit under evaluation. In implementations, the method further includes obtaining, by the network controller from the database, a state of the one or more actional elements related to the circuit under evaluation. In implementations, the minimum utilization requirements include maintaining network redundancy. In implementations, the minimum utilization requirements include maintaining a minimum network capacity. In implementations, the method further includes continuously evaluating, by the network controller, each circuit transiting between respective systems in the network.

Disclosed herein are systems for automatically optimizing power utilization in a network. In implementations, a service provider system includes a system inventory database containing a list of systems in a network, where each system includes one or more actionable components, a circuit inventory database containing a list of circuits, where each circuit traverses at least two of the systems and has fate sharing dependency information, and a controller connected to the system inventory database, the circuit inventory database, and the system configuration database. The controller is configured to receive the systems provisioned in the network from system inventory database, receive a predictive traffic model for a circuit under evaluation from the circuit inventory database, receive real-time traffic statistics for the circuit under evaluation from the circuit inventory database, and when the real-time traffic model statistics are within a threshold of the predictive traffic model, act on one or more actional elements to optimize power utilization based on the fate sharing dependency information for the one or more actional elements and minimum utilization requirements of the network, where actional elements include the systems and respective one or more actionable components.

In implementations, each actionable component has a unique component identification number and the fate sharing dependency information includes a concatenation of unique component identification numbers associated with the at least two systems. In implementations, the one or more actional elements are related to the circuit under evaluation. In implementations, the service provider system includes a system configuration database containing a current state of the systems and associated one or more actionable components, and wherein the controller is further configured to receive a state of the one or more actional elements related to the circuit under evaluation from the system configuration database. In implementations, the minimum utilization requirements include maintaining network redundancy. In implementations, the minimum utilization requirements include maintaining a minimum network capacity. In implementations, the controller is further configured to continuously evaluate each circuit traversing between respective systems in the network.

Disclosed herein are methods for automatically optimizing power utilization in a network. In implementations, a method for real-time automatic power utilization optimization in a network includes obtaining, by a controller from a first database, systems provisioned in the network, where a system includes one or more actionable components, obtaining, by the controller from a second database, traffic model statistics for a circuit under evaluation, where the circuit transits between at least two of the systems in the network, obtaining, by the controller from the second database, real-time traffic statistics for the circuit under evaluation, determining, by the controller, whether the real-time traffic model statistics are within a threshold of the predictive traffic model statistics, and acting, by the controller when within the threshold, on one or more actional elements to optimize power utilization based on fate sharing dependencies associated with the one or more actional elements and maintaining minimum utilization requirements of the network, where actional elements include the systems and respective one or more actionable components.

In implementations, each actionable component has a unique component identification number, the circuit has a fate sharing number which is a concatenation of unique component identification numbers associated with the at least two systems, and the fate sharing number is representative of the fate sharing dependencies associated with the one or more actional elements. In implementations, the circuit has a fate sharing number associated with the at least two systems and respective associated one or more actionable components and the fate sharing number is representative of the fate sharing dependencies associated with the one or more actional elements. In implementations, the one or more actional elements are related to the circuit under evaluation. In implementations, the method further includes obtaining, by the controller from a third database, a state of the one or more actional elements related to the circuit under evaluation.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for automatically optimizing power utilization in a network, the method comprising:
    obtaining, by a network controller from a database, systems provisioned in the network, wherein a system includes one or more actionable components and wherein the systems and associated one or more actionable components are actional elements;
    obtaining, by the network controller from the database, predictive traffic model statistics for a circuit under evaluation, wherein the circuit transits between at least two systems of the systems in the network;
    obtaining, by the network controller from the database, real-time traffic model statistics for the circuit under evaluation; and
    disabling, by the network controller when the real-time traffic model statistics are within a threshold of the predictive traffic model statistics, one or more actional elements to optimize power utilization based on at least fate sharing dependencies associated with the one or more actional elements and while maintaining minimum utilization requirements of the network.

2. The method of claim 1, wherein each actionable component has a unique component identification number, the circuit has a fate sharing number which is a concatenation of unique component identification numbers associated with the at least two systems, and the fate sharing number is representative of the fate sharing dependencies associated with the one or more actional elements.

3. The method of claim 1, wherein the circuit has a fate sharing number associated with the at least two systems and respective associated one or more actionable components and the fate sharing number is representative of the fate sharing dependencies associated with the one or more actional elements.

4. The method of claim 1, wherein the one or more actional elements are related to the circuit under evaluation.

5. The method of claim 4, further comprising:
    obtaining, by the network controller from the database, a state of the one or more actional elements related to the circuit under evaluation.

6. The method of claim 1, wherein the minimum utilization requirements include maintaining network redundancy.

7. The method of claim 1, wherein the minimum utilization requirements include maintaining a minimum network capacity.

8. The method of claim 1, further comprising:
continuously evaluating, by the network controller, each circuit transiting between respective systems in the network.

9. A service provider system, comprising:
a system inventory database containing a list of systems in a network, wherein each system includes one or more actionable components;
a circuit inventory database containing a list of circuits, wherein each circuit traverses at least two of the systems and has fate sharing dependency information; and
a controller connected to the system inventory database, the circuit inventory database, and the system configuration database; the controller configured to:
receive the systems provisioned in the network from system inventory database;
receive a predictive traffic model statistics for a circuit under evaluation from the circuit inventory database;
receive real-time traffic model statistics for the circuit under evaluation from the circuit inventory database; and
when the real-time traffic model statistics are within a threshold of the predictive traffic model statistics, act on one or more actional elements to optimize power utilization based on the fate sharing dependency information for the one or more actional elements and minimum utilization requirements of the network, wherein actional elements include the systems and respective one or more actionable components.

10. The service provider system of claim 9, wherein each actionable component has a unique component identification number and the fate sharing dependency information includes a concatenation of unique component identification numbers associated with the at least two systems.

11. The service provider system of claim 9, wherein the one or more actional elements are related to the circuit under evaluation.

12. The service provider system of claim 9, further comprising:
a system configuration database containing a current state of the systems and associated one or more actionable components; and
wherein the controller is further configured to receive a state of the one or more actional elements related to the circuit under evaluation from the system configuration database.

13. The service provider system of claim 9, wherein the minimum utilization requirements include maintaining network redundancy.

14. The service provider system of claim 9, wherein the minimum utilization requirements include maintaining a minimum network capacity.

15. The service provider system of claim 9, wherein the controller is further configured to continuously evaluate each circuit traversing between respective systems in the network.

16. A method for real-time automatic power utilization optimization in a network, the method comprising:
obtaining, by a controller from a first database, systems provisioned in the network, wherein a system includes one or more actionable components;
obtaining, by the controller from a second database, traffic model statistics for a circuit under evaluation, wherein the circuit transits between at least two of the systems in the network;
obtaining, by the controller from the second database, real-time traffic statistics for the circuit under evaluation;
determining, by the controller, whether the real-time traffic model statistics are within a threshold of the predictive traffic model statistics; and
acting, by the controller when within the threshold, on one or more actional elements to optimize power utilization based on fate sharing dependencies associated with the one or more actional elements and maintaining minimum utilization requirements of the network, wherein actional elements include the systems and respective one or more actionable components.

17. The method of claim 16, wherein each actionable component has a unique component identification number, the circuit has a fate sharing number which is a concatenation of unique component identification numbers associated with the at least two systems, and the fate sharing number is representative of the fate sharing dependencies associated with the one or more actional elements.

18. The method of claim 16, wherein the circuit has a fate sharing number associated with the at least two systems and respective associated one or more actionable components and the fate sharing number is representative of the fate sharing dependencies associated with the one or more actional elements.

19. The method of claim 16, wherein the one or more actional elements are related to the circuit under evaluation.

20. The method of claim 19, further comprising:
obtaining, by the controller from a third database, a state of the one or more actional elements related to the circuit under evaluation.

* * * * *